United States Patent [19]

Friedman et al.

[11] Patent Number: 5,483,932
[45] Date of Patent: Jan. 16, 1996

[54] HOLLOW BALANCE SHAFT

[75] Inventors: Ronald S. Friedman, Commerce Township; William C. Sisco, Homer, both of Mich.

[73] Assignee: Simpson Industries, Inc., Bingham Farms, Mich.

[21] Appl. No.: 230,642

[22] Filed: Apr. 21, 1994

[51] Int. Cl.[6] .................................................. F02B 75/06
[52] U.S. Cl. .................................... 123/192.2; 74/603
[58] Field of Search ............................. 123/192.2; 74/603

[56] References Cited

U.S. PATENT DOCUMENTS

| | | | |
|---|---|---|---|
| 4,509,378 | 4/1985 | Brown | 123/192.2 |
| 4,530,255 | 7/1985 | Haslam | 123/192.2 |
| 4,677,948 | 7/1987 | Candea | 123/192.2 |
| 5,038,731 | 8/1991 | Shimada | 123/192.2 |
| 5,065,644 | 11/1991 | Shimada | 123/192.2 |

FOREIGN PATENT DOCUMENTS

| | | |
|---|---|---|
| 2822589 | 11/1979 | Germany. |
| 2079375 | 1/1982 | United Kingdom. |

*Primary Examiner*—Noah P. Kamen
*Attorney, Agent, or Firm*—Brooks & Kushman

[57] ABSTRACT

A balance shaft for an automobile engine is disclosed. The balance shaft has a hollow tubular body and a pair of end plug members permanently secured thereto, as by welding. Notches or bob weights either in line or 180° out of phase are provided in the two end plug members. The balance shaft is rotated at twice the crankshaft speed in order to balance second order forces.

43 Claims, 2 Drawing Sheets

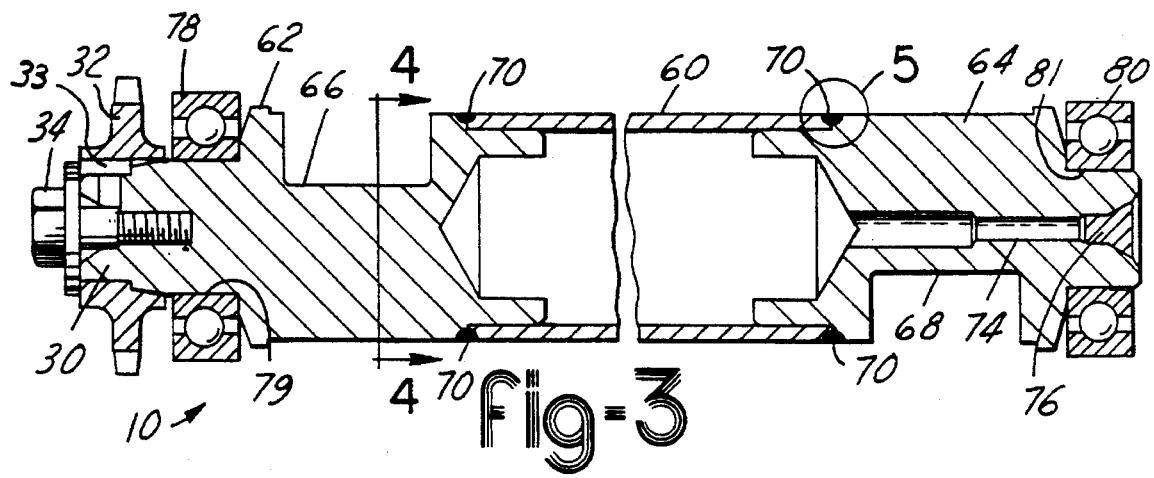
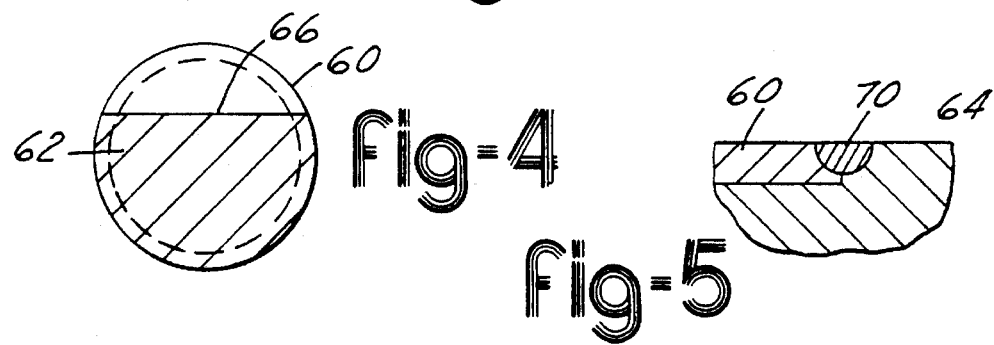
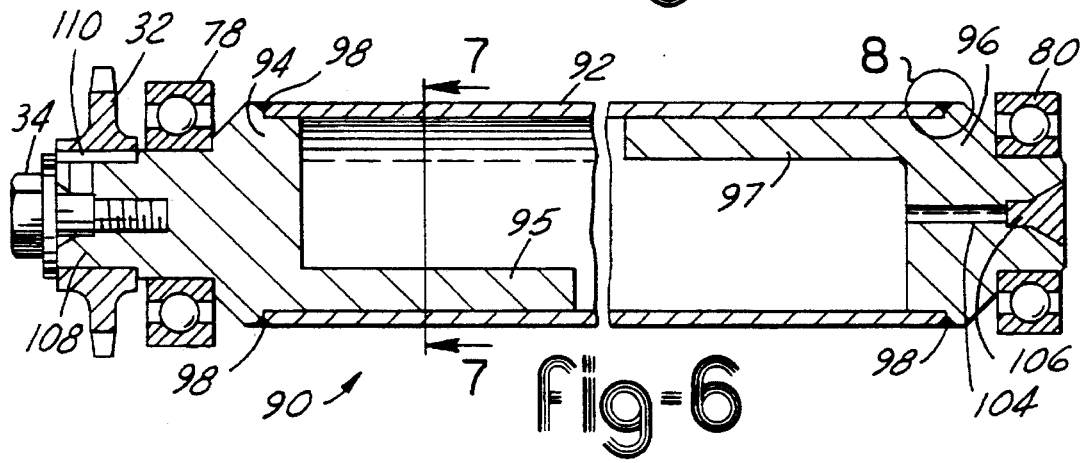
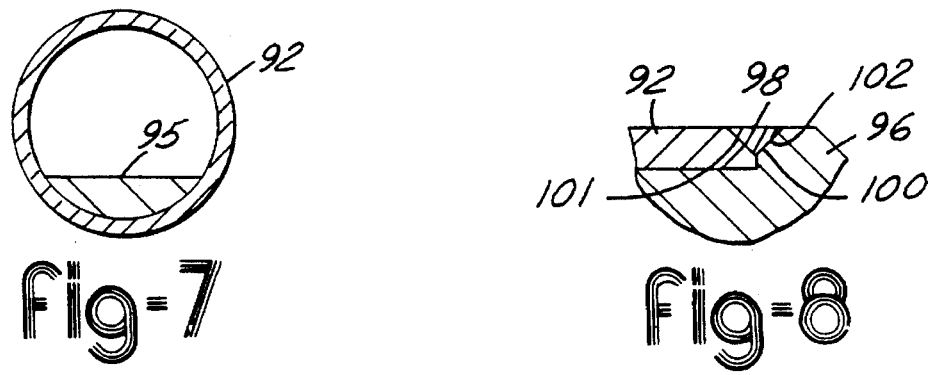

HOLLOW BALANCE SHAFT

TECHNICAL FIELD

The present invention relates to balance shafts for automobile engines.

BACKGROUND ART

There are numerous sizes and types of balance shafts used in automobile engines. Balance shafts are used to reduce or eliminate the noises and vibrations in piston engines not otherwise balanced by conventional crankshaft counterweights. These balance shafts are sometimes called "counterbalance" shafts.

Balance shafts can be rotated in the same direction as the engine crankshaft or in the opposite direction, as required for the particular engine. Some engines require a pair of balance shafts rotating in opposite directions.

Balance shafts typically have an elongated support member and one or more bob weights. The bob weights can be positioned on the same side or on opposite sides of the support member, as required.

One conventional type of balance shaft comprises a pair of opposed bob weights positioned between a pair of bearing surfaces at the two outer ends of the shaft. The bearing surfaces are supported in bearings which allow the balance shaft to rotate in accordance with the speed of the engine. A drive snout at one end is connected to a gear which is driven by the engine which in turn rotates the balance shaft. This balance shaft is normally driven at the speed of the crankshaft of the engine and thus at twice the speed of the camshaft. The balance shaft also is rotated in the opposite direction as the crankshaft.

Several types of automobile engines are inherently unbalanced, such as 90° V-6 engines, and thus need a counter rotating balance shaft. Certain engines also have second order forces which vibrate at twice the speed of the crankshaft and also need to be balanced and neutralized. It is not possible to simply rotate a conventional balance shaft at twice the crankshaft speed, however. Standard balance shafts rotated at an increased speed have a tendency to bend and wear out the support bearings.

It is thus an object of the present invention to provide an improved balance shaft for an automobile engine which can balance and neutralize engine noise and vibration forces, particularly the second order forces. It is another object of the present invention to provide a balance shaft which can rotate at twice the crankshaft speed without bending or causing excessive bearing wear.

It is still another object of the present invention to provide a balance shaft which is stiffer and lighter than traditional balance shafts and which minimizes bending when rotated at increased speeds.

Other benefits, features and advantages of the present invention will become apparent from the following description, when taken in accordance with the appended claims and accompanying drawings.

SUMMARY OF THE INVENTION

The present invention provides an improved balance shaft which is stiffer than known balance shafts and can rotate at increased speeds without harmful bending or adversely affecting the bearings. The balance shaft has a hollow tube with plugs positioned in each end.

The hollow tube is welded or otherwise affixed to the plugs to comprise an integral structure and opposed balance weights are provided or formed in the ends. A vent hole can be provided at one end of the balance shaft in order to allow hot air to escape during a welding process. A plug can be provided to seal the vent tube.

Preferably, notches are formed in the cast ends after they are welded to the tube to provide the off-center balance weights. Ball bearings are positioned on the outer ends of the plugs. One end of the balance shaft has a drive snout or extended portion which is adapted to be rotated by a belt, chain or gear drive.

An alternate form of the present invention has a hollow balance shaft with end plug members having preformed bob weights. The bob weights are formed in the plug members as they are made and are then properly positioned inside the ends of the hollow tube.

BRIEF DESCRIPTION OF THE DRAWINGS

FIG. 3 is a cross-sectional view of the hollow balance shaft shown in FIG. 1 and made in accordance with the present invention;

FIG. 4 is a cross-sectional view of the balance shaft shown in FIG. 3, when taken along lines 4—4 of FIG. 3 and in the direction of the arrows thereof;

FIG. 5 is an enlarged view illustrating the welded joints between the hollow tube and cast ends;

FIG. 6 illustrates an alternate embodiment of the present invention;

FIG. 7 is a cross-sectional view of the balance shaft shown in FIG. 6, when taken along lines 7—7 and in the direction of the arrows thereof; and FIG. 8 is an enlarged view illustrating the joint between the hollow tube and cast ends.

BEST MODE(S) FOR CARRYING OUT THE INVENTION

Figure 1:
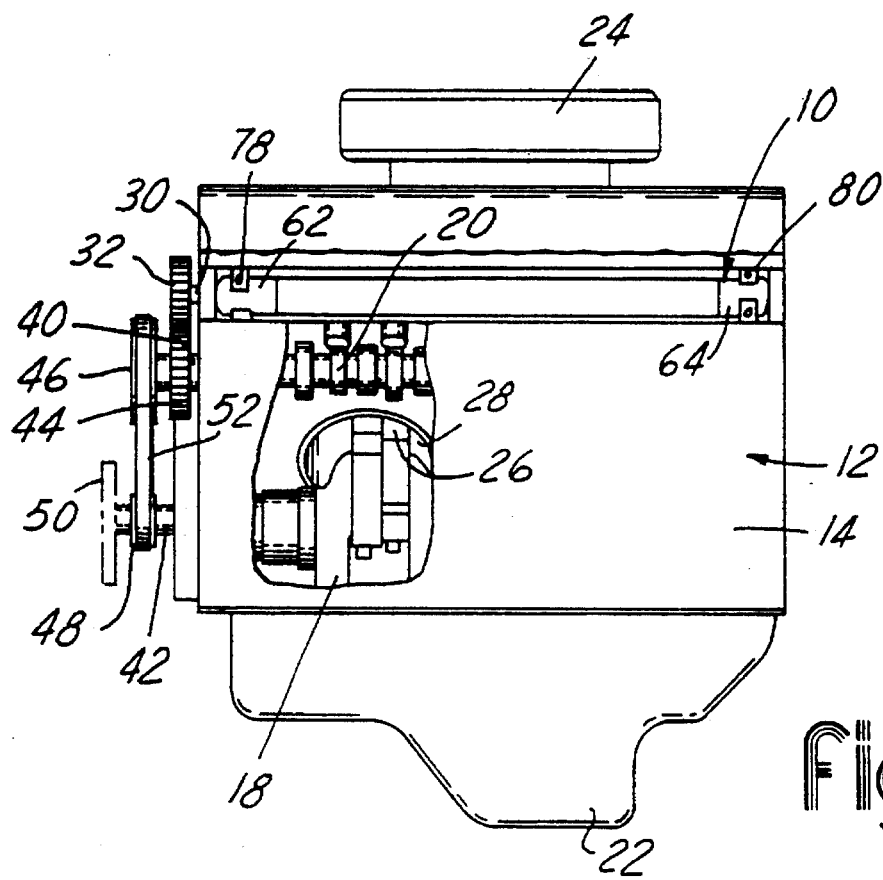
FIG. 1 is a side elevational view of an automobile engine incorporating the present invention.

The preferred embodiment of the present invention is shown in FIGS. 1–5. The present invention relates to an improved balance shaft which is generally indicated by the numeral 10 in the drawings.

The balance shaft is utilized in an automobile engine 12. The engine generally comprises a cylinder block 14, cylinder heads 16, a crankshaft 18, a camshaft 20, an oil pan 22 and an air cleaner 24. A plurality of pistons 26 are connected to the crankshaft within piston cylinders 28.

The nose or drive snout 30 protrudes outside the front of the cylinder block 14 and has a drive gear 32 attached thereto. The gear 32 is attached in any conventional manner, such as by bolt 34. Preferably, gear 32 is also attached and aligned to the snout 30 by a key and slot mechanism 33.

The camshaft 20 and crankshaft 18 also have noses or drive snouts 40 and 42, respectively, which protrude outside the front of the engine. Nose 40 of camshaft 20 is secured to drive gear 44 and pulley 46. The nose 42 of crankshaft 18 is secured to drive pulley 48. A vibration damper 50 is also preferably attached to the nose 42 of the crankshaft 18. Pulleys 46 and 48 are connected by a conventional chain drive or V-belt 52. Drive gear 44 is meshed with gear 32 on the balance shaft 10.

Figure 2:
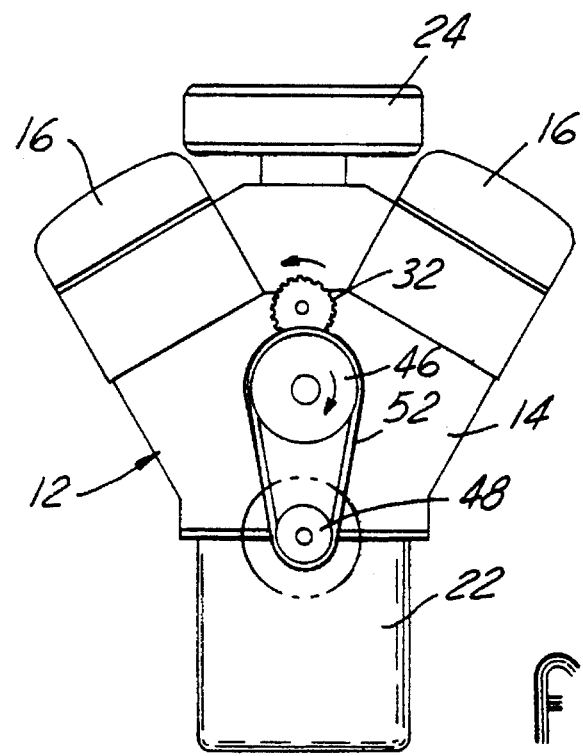
FIG. 2 is a front elevational view of the engine shown in FIG. 1.

Pulleys 46 and 48 are both rotated in the same clockwise direction by the drive chain or V-belt 52 (See FIG. 2). The respective sizes and diameters of pulleys 46 and 48 are such that the crankshaft 18 rotates at twice the speed of the camshaft 20.

The meshing of gears 32 and 44 cause the balance shaft 10 to rotate in a counterclockwise direction and thus counterbalance the vibrations caused by the crankshaft 18. Due to the size and diameters of the gears 44 and 32, the balance shaft 10 is rotated at twice the speed of the crankshaft 18 and thus at four times the speed of the camshaft 20.

The engine shown in FIGS. 1 and 2 is a 90° V-6 engine. These engines are inherently unbalanced due to their structure and geometry and thus normally require a counter rotating balance shaft. Certain engines known today also have secondary or second order forces created by the rotating crankshaft and reciprocating pistons. The second order forces often cause audible noise which is undesirable. Simply rotating a conventional counterbalance shaft at twice its normal speed may cause undesirable bending which can adversely affect the bearings on the ends of the balance shaft.

In accordance with the present invention, the balance shaft 10 is generally comprised of a hollow tubular member 60 and a pair of end plug members 62 and 64. The tube 60 is preferably made from steel, but can be made of any other material which has comparable durability and strength. The two end plug members 62 and 64 are preferably made from a metal material, such as cast iron, tungsten, bar stock SAE-1026 steel, powdered metal or the like. The plugs also can be made of any other material which meets the requirements of the application.

Notches 66 and 68 are cut or formed in the end members 62 and 64, respectively, after the end members are cast and welded to the hollow tube 60. In this manner, the notches can be formed accurately and precisely opposite one another in order to provide appropriate counterbalancing weights. It is thus unnecessary to set up a special jig or die in order to insure that the preformed notches are properly positioned prior to being attached to the ends to the tubular member 60.

Plugs 62 and 64 can be attached to the hollow tube 60 by welding. A welding bead 70 is shown in FIGS. 3 and 5. For this purpose, half-spherical grooves 72 are formed in the balance shaft 10. The grooves 72 are formed partially in the end members of the hollow tube 60 and partially in the cast ends 62, 64, as shown in the drawings.

A vent opening 74 is provided in end plug member 64 in order to allow hot air to escape during the welding process. Plug 76 is positioned in the vent tube 74 to seal it after the welding is complete.

Alternatively, the tube can be secured to the end plugs by friction welding. If this procedure is utilized, weld grooves (such as 72) and air vent openings (such as 74) are not needed. Also, the inner ends or end surfaces of the plug members can be flat or planar.

Ball bearings 78 and 80 are positioned on the two ends of the balance shaft 10. Surfaces 79 and 81 on the end members 62 and 64, respectively, are machined in order to allow proper fitting of the bearings. When the balance shaft 10 is mounted in the engine 12, the bearings 78 and 80 are positioned to allow the balance shaft to rotate freely.

The hollow balance shaft of the present invention provides a counterbalance which is stiffer than known balance shafts and thus can be rotated at the required speeds (i.e. twice the crankshaft speed) with minimal bending and without having substantial adverse effects on the bearings. Also, by positioning the counterbalance weights adjacent the bearings on the ends of the balance shaft, lighter bob weights can be utilized and a smaller bending moment will be created at the increased speeds. The use of ball bearings rather than flat bearing surfaces also assists in preventing adverse effects caused by the speed of the balance shaft.

In addition, as opposed to conventional balance shafts, the balance shaft of the present invention has a more uniform cross section. As a result, the present invention with a smooth cylindrical surface rather than protruding weights does not churn the surrounding engine oil as much and thus requires less power to rotate it. This could result in better gas mileage for the engine.

An alternate embodiment of the present invention is shown in FIGS. 6–8. This balance shaft is generally referred to by the reference numeral 90.

Balance shaft 90 includes a hollow tubular member 92 which is essentially the same size and material as tube 60 described above with reference to FIGS. 1–5. Balance shaft 90 also includes a pair of end plug members 94 and 96 which preferably are made from a material similar to end members 62 and 64 discussed above.

In this alternative embodiment, the end plugs have their counterbalanced weights preformed in them. End plug 94 has protruding counter weight 95 formed in it while end plug 96 has protruding counterweight 97 formed in it. In order to mount the end plugs 94 and 96 in the hollow tube 92, it is necessary to precisely position the bob weights 95 and 97 relative to one another. The bob weights can be positioned 180° opposed to one another, as shown in FIG. 6, or they can be positioned in line, depending on the use and application. When the end plugs are set in position, the hollow tubular member 92 is welded to the end plugs 94 and 96 by welds 98. As shown in FIG. 8, a V-groove 100 is formed between the ends 101 of the tubular member 92 and the groove or channel 102 in the end caps.

A vent tube 104 can be provided in end cap 96 in order to allow escape of the hot gases formed by the welding process. Plug 106 is inserted in the end of the vent tube 104 to seal it after the components of the balance shaft are welded together.

Ball bearings 78 and 80 are positioned on the two outer ends of the balance shaft 90. Drive gear 32 is positioned on the snout 108 formed on end plug 94. The gear 32 is connected to the snout 108 by bolt 34 or any other conventional fastener mechanism, and is also keyed to the snout 108 by a conventional slot and key mechanism 110.

The operation of the balance shaft 90 shown in FIGS. 6–8 is the same as the operation of the balance shaft 10 described above with reference to FIGS. 1–5.

Although particular embodiments of the present invention have been illustrated in the accompanying drawings and described in the foregoing detailed description, it is to be understood that the present invention is not to be limited to just the embodiments disclosed, but that they are capable of numerous rearrangements, modifications and substitutions without departing from the scope of the claims hereafter.

What is claimed is:

1. A balance shaft for an automobile engine comprising:
   a hollow tubular member having two ends;
   a first plug member secured by welding to one end of said tubular member; and
   a second plug member secured by welding to the other end of said tubular member;

said first plug member having an air vent therein.

2. The balance shaft of claim 1 wherein said welding comprises friction welding.

3. The balance shaft of claim 1 further comprising a plug member in said air vent.

4. The balance shaft of claim 1 further comprising a first annular groove at the joint between said tubular member and said first plug member, and a second annular groove at the joint between said tubular member and said second plug member, and a first weld is positioned in said first annular groove, and a second weld is positioned in said second annular groove.

5. The balance shaft of claim 4 wherein said first annular groove is formed in part in the corresponding end of said tubular member and in part in the adjacent portion of said first plug member.

6. The balance shaft of claim 5 wherein said second annular groove is formed in part in the corresponding end of said tubular member and in part in the adjacent portion of said second plug member.

7. The balance shaft of claim 1 wherein said first plug member has a first notch formed in it and said second plug member has a second notch formed in it, said first notch and said second notch being positioned 180° opposed to each other.

8. The balance shaft of claim 1 wherein said first plug member has a first protruding bob weight formed on it and said second plug member has a second protruding bob weight formed on it, said first bob weight and said second bob weight being positioned 180° opposed to each other.

9. The balance shaft of claim 8 wherein said first bob weight and said second bob weight are positioned inside said hollow tubular member.

10. The balance shaft of claim 1 further comprising a drive snout on said second plug member.

11. The balance shaft of claim 1 further comprising a first bearing member positioned on said first plug member and a second bearing member positioned on said second plug member.

12. A method for forming a balance shaft for an automobile engine having a crankshaft, comprising providing an elongated hollow tubular member with two ends, attaching a first plug member to a first end of said tubular member, attaching a second plug member to the second end of said tubular member, forming a first notch in said first plug member, and forming a second notch in said second plug member, whereby said balance shaft can be rotated at twice the speed of said crankshaft and thereby balance second order vibration forces of said engine.

13. The method as set forth in claim 12 wherein said first and second notches are formed 180° opposed to one another.

14. The method as set forth in claim 12 wherein said first and second plug members are permanently attached to said tubular member by welding.

15. The method as set forth in claim 14 wherein said welding comprises friction welding.

16. A balance shaft for an automobile engine comprising:

a hollow tubular member having two ends;

a first plug member secured to one end of said tubular member by welding;

a second plug member secured to the other end of said tubular member by welding;

a first annular groove being provided at the joint between said tubular member and said first plug member, a second annular groove being provided at the joint between said tubular member and said second plug member, a first weld positioned in said first annular groove, and a second weld positioned in said second annular groove.

17. The balance shaft of claim 16 further comprising an air vent in said first plug member.

18. The balance shaft of claim 17 further comprising a plug member in said air vent.

19. The balance shaft of claim 16 wherein said first annular groove is formed in part in the corresponding end said tubular member and in part in the adjacent portion of said first plug member.

20. The balance shaft of claim 16 wherein said second annular groove is formed in part in the corresponding end of said tubular member and in part in the adjacent portion of said second plug member.

21. The balance shaft of claim 16 wherein said first plug member has a first notch formed in it and said second plug member has a second notch formed in it, said first notch and said second notch being positioned 180° opposed to each other.

22. The balance shaft of claim 16 wherein said first plug member has a first protruding bob weight formed on it and said second plug member has a second protruding bob weight formed on it, said first bob weight and said second bob weight being positioned approximately 180° opposed to each other.

23. The balance shaft of claim 22 wherein said first bob weight and said second bob weight are positioned inside said hollow tubular member.

24. The balance shaft of claim 16 further comprising a drive snout on said second plug member.

25. The balance shaft of claim 16 further comprising a first bearing member positioned on said first plug member and a second bearing member positioned on said second plug member.

26. A balance shaft for an automobile engine comprising a hollow tubular member having two ends, a first plug member secured to one end of said tubular member, and a second plug member secured to the other end of said tubular member, said first plug member having a first notch in it and said second plug member having a second notch in it, said first and second notches being positioned substantially 180° opposed to one another.

27. The balance shaft of claim 26 wherein said first and second plug members are secured to said tubular member by welding.

28. The balance shaft of claim 27 further comprising an air vent in said first plug member.

29. The balance shaft of claim 28 further comprising a plug member in said air vent.

30. The balance shaft of claim 27 further comprising a first annular groove at the joint between said tubular member and said first plug member, and a second annular groove at the joint between said tubular member and said second plug member, and a first weld is positioned in said first annular groove, and a second weld is positioned in said second annular groove.

31. The balance shaft of claim 30 wherein said first annular groove is formed in part in the corresponding end of said tubular member and in part in the adjacent portion of said first plug member.

32. The balance shaft of claim 26 wherein said welding comprises friction welding.

33. A balance shaft for an automobile engine comprising
a hollow tubular member having two ends,
a first plug member secured to one end of said tubular member, and
a second plug member secured to the other end of said tubular member,
said first plug member having a first protruding bob weight and said second plug member having a second protruding bob weight, said first and second bob weights being positioned substantially 180° opposed to one another.

34. The balance shaft of claim 33 wherein said first and second plug members are secured to said tubular member by welding.

35. The balance shaft of claim 34 wherein said welding comprises friction welding.

36. The balance shaft of claim 34 further comprising an air vent in said first plug member.

37. The balance shaft of claim 36 further comprising a plug member in said air vent.

38. The balance shaft of claim 34 further comprising a first annular groove at the joint between said tubular member and said first plug member, and a second annular groove at the joint between said tubular member and said second plug member, and a first weld is positioned in said first annular groove, and a second weld is positioned in said second annular groove.

39. The balance shaft of claim 38 wherein said first annular groove is formed in part in the corresponding end of said tubular member and in part in the adjacent portion of said first plug member.

40. The balance shaft of claim 39 wherein said second annular groove is formed in part in the corresponding end of said tubular member and in part in the adjacent portion of said second plug member.

41. The balance shaft of claim 33 wherein said first bob weight and said second bob weight are positioned inside said hollow tubular member.

42. The balance shaft of claim 33 further comprising a drive snout on said second plug member.

43. The balance shaft of claim 33 further comprising a first bearing member positioned on said first plug member and a second bearing member positioned on said second plug member.

* * * * *

UNITED STATES PATENT AND TRADEMARK OFFICE
CERTIFICATE OF CORRECTION

PATENT NO. : 5,483,932
DATED : January 16, 1996
INVENTOR(S) : Ronald S. Friedman It is certified that error appears in the above-indentified patent and that said Letters Patent is hereby corrected as shown below:

Column 6, Line 1, Claim 19 (Amendment Dated June 29, 1995, Page 3, Line 1, Claim 24), after "end" insert --of--;

Signed and Sealed this

Twenty-eighth Day of May, 1996

Attest:

BRUCE LEHMAN

*Attesting Officer*     Commissioner of Patents and Trademarks